United States Patent [19]

Ott

[11] Patent Number: 6,035,906
[45] Date of Patent: *Mar. 14, 2000

[54] SELF-CLOSING GAS FOR AUTOMATIC FILLING MACHINES

[75] Inventor: Siegfried Ott, Hufschlag, Germany

[73] Assignee: Mecrom Ott U. Holey Ohg, Hufschlag, Germany

[*] Notice: This patent is subject to a terminal disclaimer.

[21] Appl. No.: 08/883,965

[22] Filed: Jun. 27, 1997

Related U.S. Application Data

[63] Continuation-in-part of application No. 08/687,783, Jul. 31, 1996, Pat. No. 5,720,328.

[51] Int. Cl.⁷ ........................................... B65B 1/04
[52] U.S. Cl. .................... 141/312; 141/301; 220/86.2; 220/DIG. 33
[58] Field of Search ...................... 141/312, 348, 141/349, 350, 369, 370, 59, 384, 304, 301, DIG. 1; 220/86.2, DIG. 33, 254

[56] References Cited

U.S. PATENT DOCUMENTS

| | | |
|---|---|---|
| 4,091,959 | 5/1978 | O'Banion . |
| 4,337,873 | 7/1982 | Johnson ................................. 220/204 |
| 4,762,247 | 8/1988 | Temmesfeld . |
| 4,977,936 | 12/1990 | Thompson et al. . |
| 4,986,439 | 1/1991 | Ott et al. . |
| 5,042,678 | 8/1991 | Munguia . |
| 5,195,566 | 3/1993 | Ott et al. . |
| 5,234,039 | 8/1993 | Aoshima et al. . |
| 5,238,034 | 8/1993 | Corfitsen . |
| 5,322,100 | 6/1994 | Buechler et al. . |
| 5,449,086 | 9/1995 | Harris . |
| 5,547,099 | 8/1996 | Chang . |
| 5,720,328 | 2/1998 | Ott ........................................ 141/312 |

FOREIGN PATENT DOCUMENTS

| | | |
|---|---|---|
| 1138376 | 12/1982 | Canada . |
| 94/05592 | 3/1994 | WIPO . |
| 96/05135 | 2/1996 | WIPO . |
| 96/05136 | 2/1996 | WIPO . |
| 96/33095 | 10/1996 | WIPO . |

OTHER PUBLICATIONS

*Fuel Filler Cap*, Research Disclosure, No. 352, Aug. 1, 1993, 551 XP000395278, see Paragraph 2, see Fig. 1.

*Primary Examiner*—Steven O. Douglas
*Attorney, Agent, or Firm*—Sixbey Friedman Leedom & Ferguson; Thomas W. Cole

[57] ABSTRACT

A self-closing cap for the fuel filler neck of a vehicle is provided which is particularly adapted for use with an automatic gas filling machine. The cap comprises a closure ring having an annular body and screw threads or bayonet lugs for detachably mounting the periphery of the annular body around the open end of the filler neck, and a closure flap assembly formed from a circular member with a nozzle receiving opening, a closure flap spring biased over the opening, and a pivotal mounting connecting the flap over the opening. The closure flap assembly includes a locking ratchet mechanism for securing the circular member over the closure ring in a selected angular position such that the pivotal mounting is substantially 180° opposite from the pivotal connection of the restrictive flap within a filler neck of a vehicle to allow a fuel nozzle from an automatic gas filling machine to be smoothly inserted into and withdrawn from the self-closing cap. The cap has a cover that snap-fits over the closure flap assembly. The top wall of the cover serves as an inclined guide face for guiding the nozzle of an automatic gas filling machine into the opening of the closure flap assembly. An overpressure valve assembly is incorporated into the circular member for releasing vapor and gases from the vehicle fuel tank when the pressure in the tank approaches a tank-rupturing level.

32 Claims, 5 Drawing Sheets

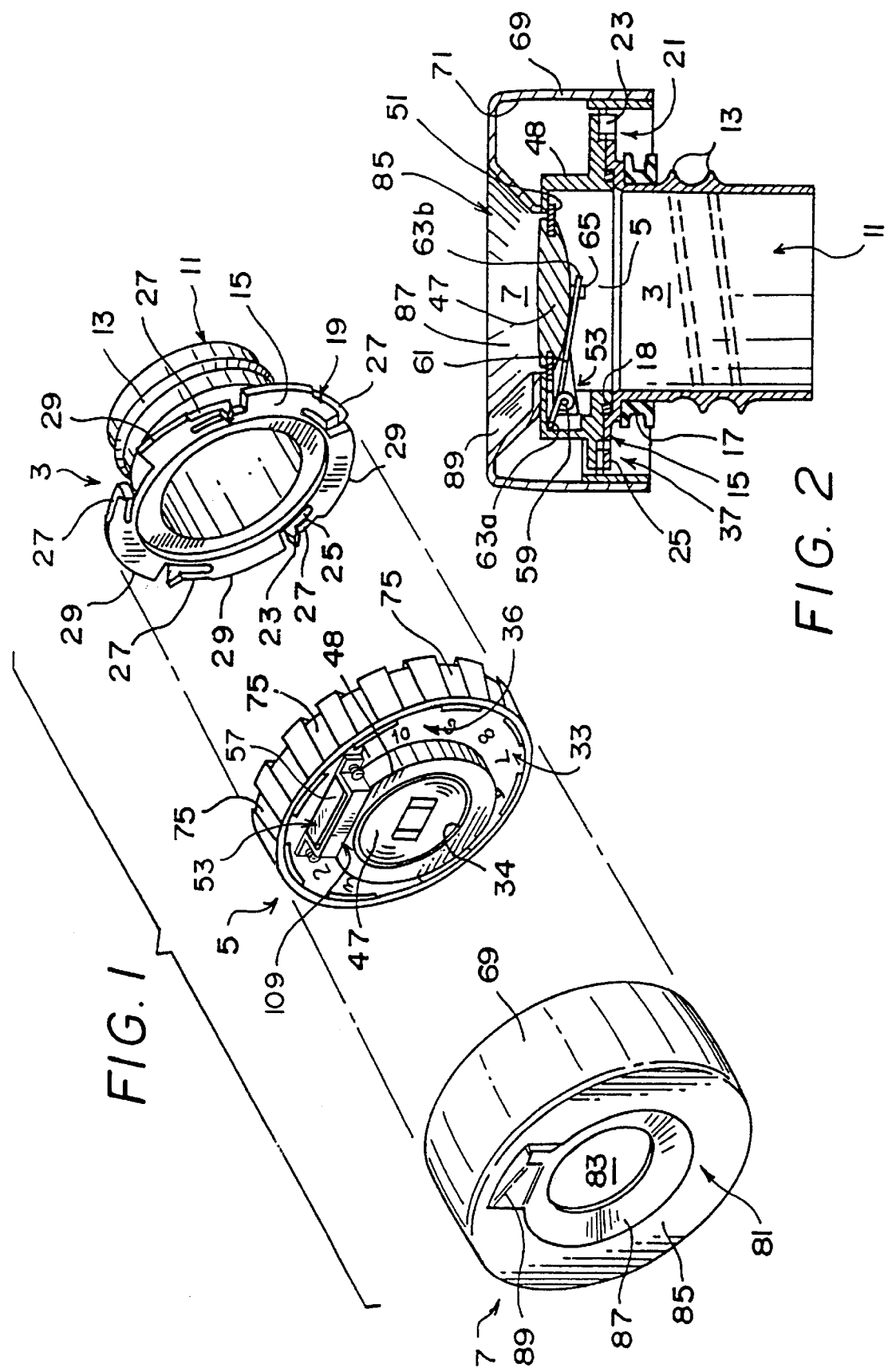

under the horizontal line "6,035,906"

SELF-CLOSING GAS FOR AUTOMATIC FILLING MACHINES

This application is a continuation-in-part of U.S. patent application Ser. No. 08/687,783, now U.S. Pat. No. 5,720,328, filed Jul. 31, 1996.

BACKGROUND OF THE INVENTION

This invention generally relates to self-closing caps for automotive fuel tanks, and is particularly concerned with a self-closing cap adapted for use with an automatic fuel filling machine.

Self-closing caps for automotive fuel tanks are well known in the prior art. Such caps allow a vehicle operator to fill the tank of his automobile or truck without the inconvenience of removing the gas cap from the filler neck. Such caps generally comprise a cap body with either screw threads or bayonet lugs for securing the cap body onto the open end of the filler neck of the car or truck gas tank. The cap body has a centrally disposed opening for receiving the nozzle of a gasoline or diesel fuel pump. This opening is normally covered by a spring biased closure flap that is pivotally connected to the cap body. A cover having finger indentations around its periphery and a centrally disposed opening aligned with the opening in the cap body is typically provided. In operation, the vehicle operator installs the self-closing cap in a conventional manner by screwing it over the filler neck of the fuel tank. To fill the tank the nozzle of a fuel pump is inserted through the opening in the cover and through the spring biased closure flap in the cap body. After the fuel tank has been filled, the nozzle is withdrawn and the spring in the cap body pivots the closure flap in its initial position against the nozzle receiving opening in sealing engagement. A particularly good example of such a prior art cap is disclosed and claimed in U.S. Pat. No. 4,986,439, the entire text of which is expressly incorporated herein by reference.

While these devices work well with conventional gas pumps where an operator manually operates a gas nozzle, the inventor has observed that such caps are poorly adapted for use with automatic fuel filling machines. Such machines include a robotic arm capable of moving both vertically and horizontally for aligning the nozzle of a gas pump with the filler neck of the truck or automobile. Such alignment is facilitated by the use of a magnetic position sensor in the robotic arm. After such alignment is completed, the robotic arm extends a gas nozzle toward the filler neck at an angle that is approximately orthogonal with respect to the vehicle wall surrounding the neck. The robot then extends the nozzle through the opening in the cap body and into the filler neck of the fuel tank by pushing down the pivotally mounted closure flap in the cap. In vehicles that run exclusively off of unleaded fuel, the fuel nozzle must also be extended through a second, pivotally mounted flap in the filler neck before the refueling operation can begin. The automatic filling machine then fills the tank through the nozzle and retracts the nozzle out of the filler neck and the cap in order to allow the restrictive flap in the neck and the closure flap in the cap to resume a closed position.

While roboticized fuel filling machines show great promise for the future, the applicant has observed three unfortunate incompatibilities between such machines and prior art self-closing gas cap designs. First, if the pivotal connection of the restrictive flap in the filler neck is not disposed approximately 180° from the pivotal mounting of the closure flap, the nozzle of such roboticized fuel filling machines may not be aligned with the restrictive flap when the machine attempts to extend the nozzle into the filler neck. Secondly, even if the machine succeeds in extending the nozzle through both flaps, the nozzle may become jammed in the filler neck when the machine attempts to withdraw it. Either malfunction can result in damage to the self-closing cap or the fuel nozzle. Thirdly, because some filler necks are more obliquely than orthogonally oriented with respect to the adjacent sidewall of the truck or car to which they belong, the fuel nozzle of a roboticized filling machine can sometimes even fail to properly align with and extend through the closure flap of the self-closing cap.

Clearly, there is a need for a self-closing gas cap that can be consistently mounted at an angular position on the filler neck of a vehicle such that the pivotal connection of the restrictive flap in the neck of vehicles using unleaded fuel only is advantageously disposed 180° away from the pivotal mounting between the closure flap and the body of the gas cap. Such a self-closing gas cap should further have some sort of provision for insuring that the nozzle of an automatic filling machine is smoothly and consistently received through the gas cap and into the filler neck even when the filler neck is not well aligned with the fuel nozzle of the automatic filling machine. It would be desirable if such a gas cap had an overpressure to prevent a rupture of the vehicle gas tank in the event of an accident. Finally, such a gas cap should be reliable in operation, relatively simple in structure, and easy and economical to manufacture.

SUMMARY OF THE INVENTION

Generally speaking, the invention is a self-closing cap for a filler neck of a container such as a fuel tank that is particularly adapted for use with an automatic filling machine. The self-closing cap is comprised of a closure ring having an annular body with screw threads or bayonet-style lugs for detachably mounting the periphery of the ring around the periphery of the filler neck, and a closure flap assembly including a circular member having a closure flap pivotally mounted over a centrally-disposed opening for receiving a fuel nozzle, and means in the form of a ratchet lock mechanism for affixing the circular member in a selected angular position with respect to the closure ring. In operation, the ratchet lock mechanism allows the circular member to be affixed in a position on the closure ring so that the pivotal mounting that supports the closure flap in the circular member is oriented 180° opposite from the pivotal connection that supports the restrictive flap in the filler neck of a vehicle that runs only on unleaded fuel. Such an opposing orientation allows a fuel nozzle to be extended through the central opening of the closure flap assembly and through a restrictive flap in a filler neck without jamming interference, and further allow the nozzle to be withdrawn without jamming.

The self-closing cap of the invention also includes a cover that is detachably mounted over the closure flap assembly. The cover includes a port for receiving a fuel nozzle and a guide face for guiding the nozzle through the port. The guide face may be inclined with respect to the circular member of the closure flap assembly to facilitate the alignment of the nozzle into the port when the filler neck of the vehicle is not oriented orthogonally with respect to the surrounding wall of the vehicle.

Finally, the gas cap of the invention includes an overpressure valve assembly that safely releases gases and vapors from the gas tank in the event of an overpressure condition which may be caused, for example, by an accident. The overpressure valve assembly is advantageously integrated into the bearing block structure which mounts the closure flap, and is calibrated to open before a rupture condition occurs within the gas tank.

The invention further encompasses a method of operation of the self-closing cap of the invention. In the first step of the method, the annular body of the closure ring is mounted around the periphery of the filler neck. Next, if the filler neck includes a restrictive flap, the angular orientation of the pivotal connection between the restrictive flap and the inner diameter of the fuel filler neck is noted. The circular member of the closure flap assembly is then rotated with respect to the closure ring via the ratchet locking mechanism such that the pivotal mounting of the closure flap is disposed 180° opposite from the pivotal connection of the restrictive flap to allow a fuel nozzle from an automatic filling machine to be smoothly extended into and withdrawn from the cap. Finally, a cap cover is installed over the closure flap assembly that has a guide face that is inclined in such a way as to facilitate alignment between such a fuel nozzle and the opening in the cap.

BRIEF DESCRIPTION OF THE SEVERAL FIGURES

FIG. 1 is an exploded perspective view of the self-closing gas cap of the invention, illustrating how the closure ring, the flap assembly, and cover fit together to form the cap;

FIG. 2 is a cross-sectional side view of the cap illustrated in FIG. 1 after assembly;

Figures 3, 4:
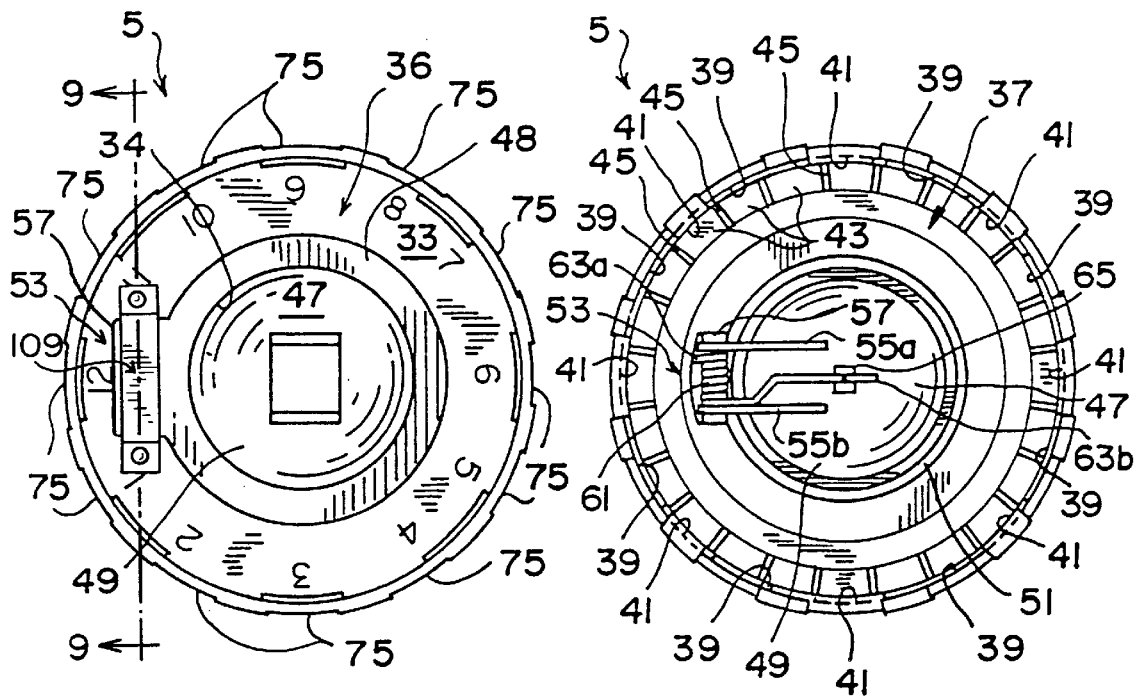
FIGS. 3 and 4 are top plan and bottom plan views, respectively, of the cover of the gas cap illustrated in FIG. 1.
Figure 7:
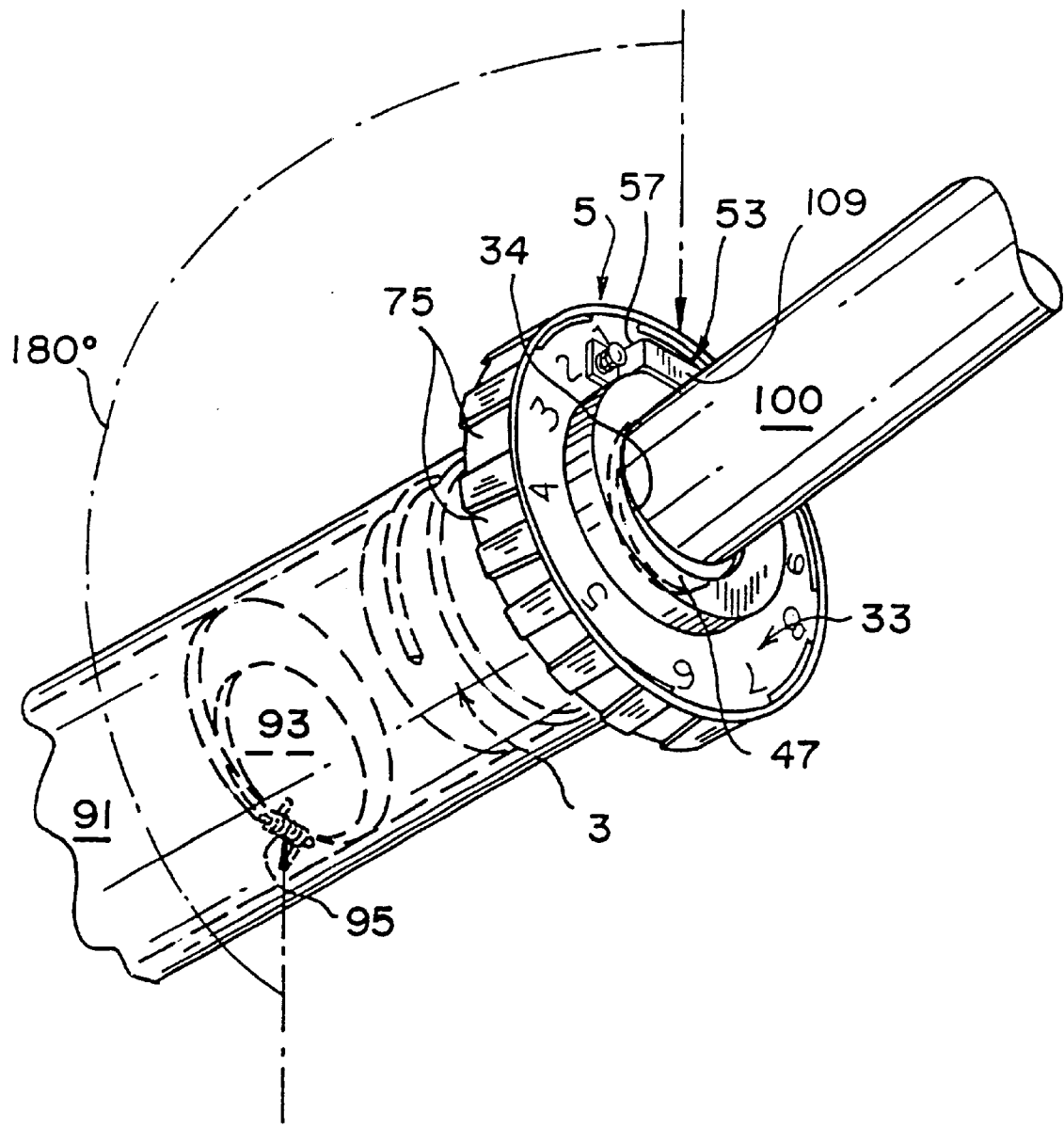
Figure 8A:
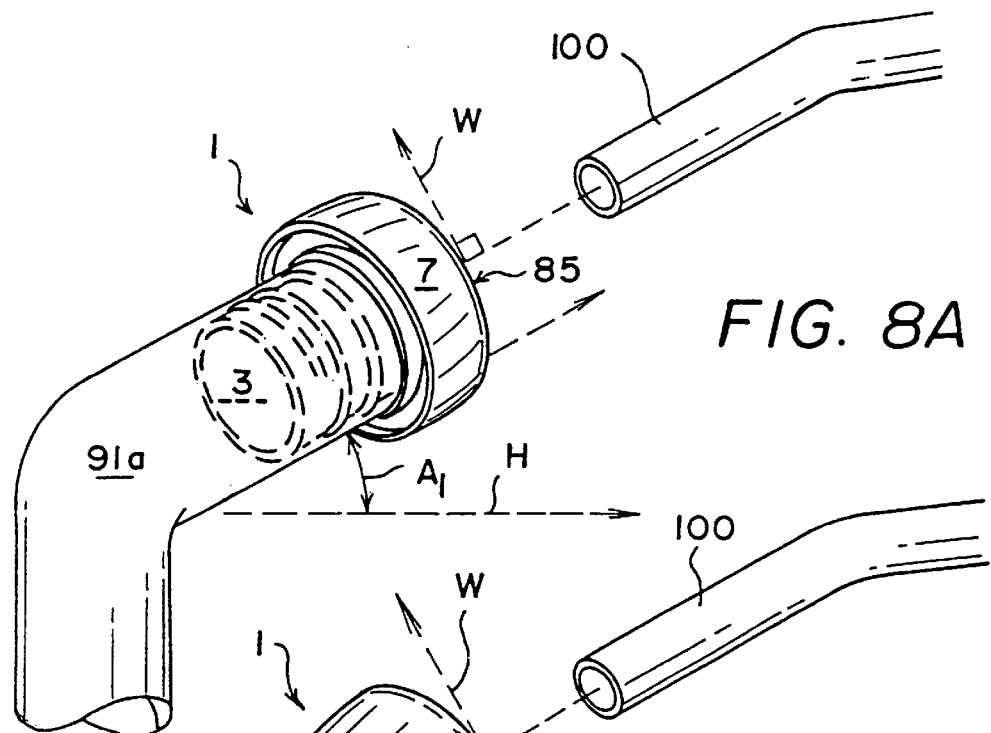
Figure 8B:
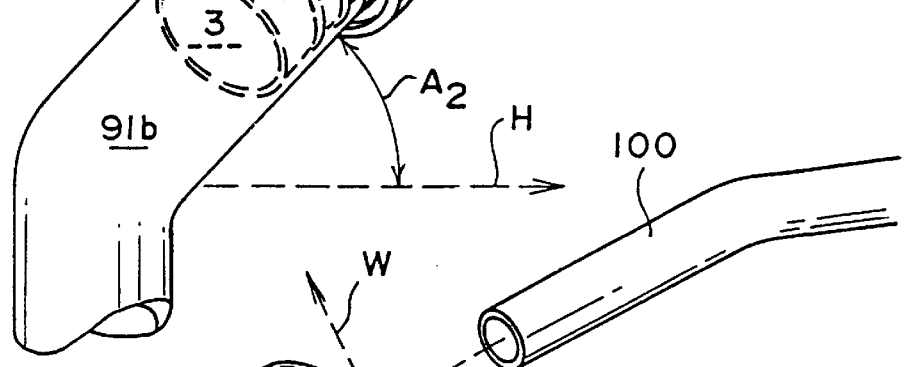
Figure 8C:
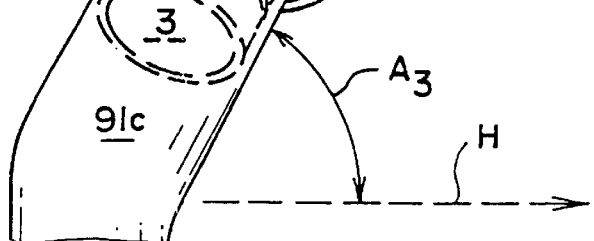
Figure 9:
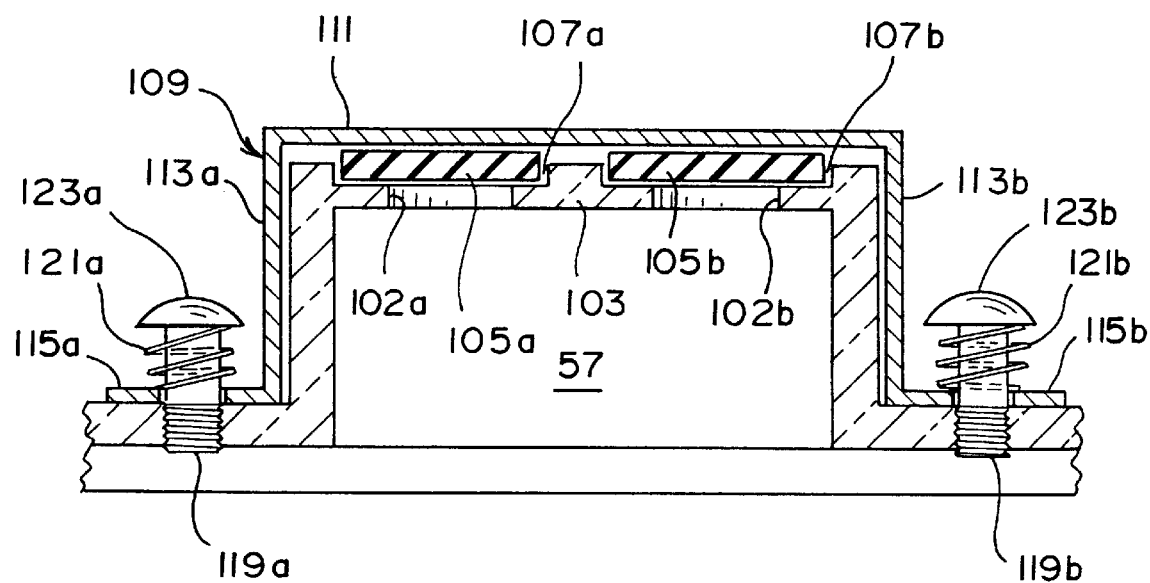

FIGS. 7A, 7B, and 7C illustrate how the closure ring and closure flap assembly of the cap may be fitted with cap covers having guide faces oriented at different angles to compensate for differently angled filler necks in order to facilitate the insertion of a fuel nozzle into the cap, FIG. 8 is a perspective view of a cap (shown without a cover) whose closure flap assembly has been installed on the closure ring such that the pivotal mounting of the closure flap is oriented 180° from the pivotal connection between the restrictive flap commonly mounted in the filler necks of vehicles designed for use with lead free gasoline only, and FIG. 9 is a side, cross-section view of the overpressure valve along the line 9—9 in FIG. 3.

DETAILED DESCRIPTION OF THE PREFERRED EMBODIMENT

With reference to FIG. 1, wherein like numbers designate like components throughout all the several figures, the self-closing cap 1 of the invention generally comprises a closure ring 3, a closure flap assembly 5, and a cover 7, each of which may be snap-fitted together to form a cap over the filler neck of a vehicle.

As shown in FIGS. 1 and 2, the closure ring 3 includes a tubular mounting portion for installing the ring onto the filler neck of a motor vehicle. The tubular mounting portion illustrated is provided with screw threads 13 for this purpose. However, bayonet-type lugs disposed 180° from one another may be used in lieu of screw threads, depending upon the type of filler neck that the cap is installed upon. Closure ring 3 further includes an annular body 15 circumscribing the upper edge of the tubular mounting portion 11. As may be seen in FIG. 2, an annular sealing gasket 17 circumscribes the juncture of the tubular mounting portion 11 and the annular body 15 in order to create a vapor-tight seal when the cap 1 is screwed onto the filler neck of a vehicle. An O-ring 18 is provided between the annular body 15 and the closure flap assembly 5 to create a vapor-tight seal between these two components. As may best be seen in FIG. 1, the circumference of the annular body 15 includes a plurality of ratchet teeth 19. These teeth 19 form part of a ratchet lock mechanism (generally indicated at 21 in FIG. 2) that serves to securely mount the closure flap assembly 5 onto the closure ring 3 at a desired angular orientation. Each of the ratchet teeth 19 is formed from a tooth 23 mounted at the end of a cantilever spring portion 25. Further disposed around the circumference of the annular body 15 are a plurality of recess portions 27, and flange portions 29. As will be described shortly hereinafter, the recess and flange portions 27,29 likewise form part of the ratchet lock mechanism 21 that serves to secure the closure flap assembly 5 over the closure ring 3.

With reference now to FIGS. 3 and 4, the closure flap assembly 5 generally comprises a circular member 33 having a centrally disposed circular opening 34 for the admission of a fuel nozzle. Circular member 33 has a front side 36 which faces away from the filler neck of a vehicle when installed, and a back side 37 that engages the annular body 15 of the closure ring 3. The periphery of the back side 37 includes alternating recesses 39 and snap-fit portions 41 for receiving the previously mentioned flange and recess portions 29,27 of the closure ring 3. Radially oriented ridges 45 are disposed around the periphery of the back side 37 of the circular member 33 to define tooth receiving portions 43.

The ratchet lock mechanism 21 affixes the closure flap 5 to the closure ring 3, and allows the closure flap 5 assembly to rotate clockwise with respect to the ring 3, but not counterclockwise. In assembling these two components, the back side 37 of the circular member 33 is held in alignment over the annular body 15 of the closure 3 in the position illustrated in FIG. 1. The two parts are then engaged so that the peripheral ends of the recess portions 27 of the closure ring 3 are snap-fitted under the protruding portions 41 around the periphery of the circular member 33. The circular member 33 is then twisted a small angular distance so that the flange portions 29 of the closure ring 3 slide under the snap-fit portions of the closure flap assembly 5. In such a position, the ratchet teeth 19 are engaged within the tooth receiving portions 43 of the closure flap assembly 5 to allow the assembly 5 to turn in the clockwise direction with respect to the closure ring 3, but not in the counterclockwise direction.

Closure flap assembly 5 further includes the previously mentioned closure flap 47. Flap 47 is contained within an annular protruding portion 48 that extends above the front side 36 of the circular member 33. The flap 47 is formed from a disk-shaped body 49 circumscribed by an annular sealing gasket 51. A mounting assembly 53 pivotally mounts the flap 47 to the circular member 33 at the twelve-o'clock position drawn on the front side 36 of the member. The pivotal mounting assembly 53 comprises a pair of bearing arms 55a,b integrally formed in the disk-shaped body 49. Assembly 53 also includes a bearing block 57 that supports a shaft 59 (shown in FIG. 2). A torsion spring 61 circumscribes the shaft 59. One end 63a of the spring 61 engages the backside 37 of the circular member 33, while the other end 63b is disposed within a spring retainer 65 integrally formed in the disk-shaped body 49 of the flap 47. The torsion spring 61 biases the closure flap 47 in a closed position over the circular opening 35 with a sufficient amount of force for the annular gasket 51 to effect a seal between the flap 47 and the periphery of the circular opening 34.

Figures 5, 6:
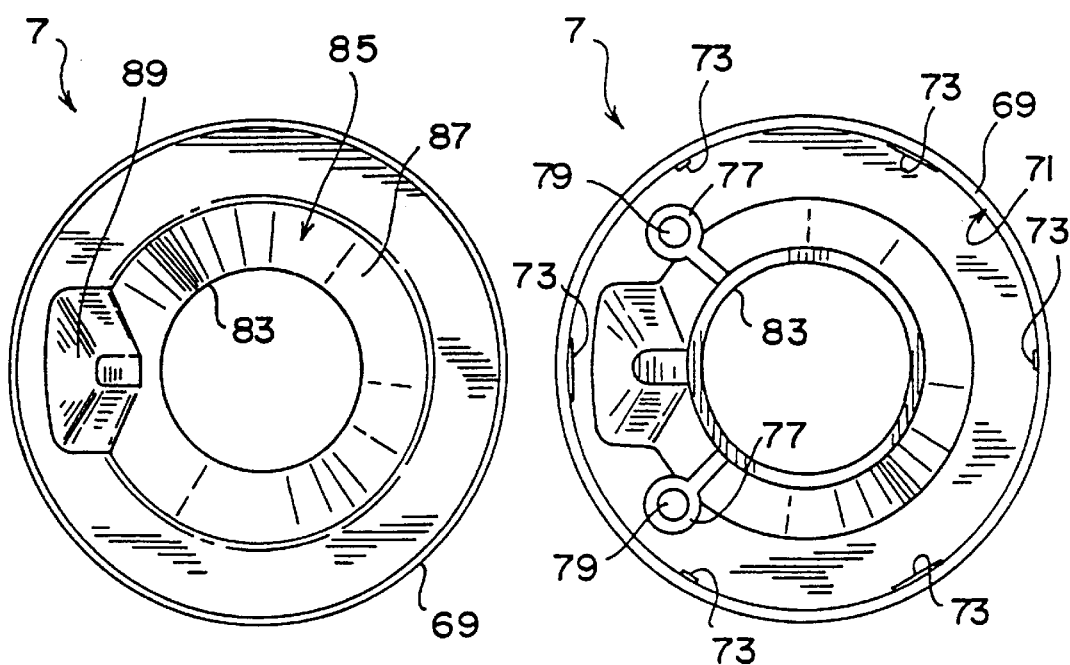
FIGS. 5 and 6 are top plan and bottom plan views, respectively, of the closure flap assembly of the cap illustrated in FIG. 1.

With respect now to FIGS. 5 and 6, the cover 7 of the self-closing cap 1 includes a cylindrical mounting portion 69 that is open at its lower end, and covered by upper wall 81 at its top end. The cylindrical mounting portion 69 has an inner surface 71 that includes six shallow rails 73 disposed around its periphery (as may be seen FIG. 6). These rails 73 may be slid into shallow, peripheral slots 75 disposed around the periphery of the circular member 33 of the closure flap assembly 5. As will be discussed hereinafter, the mating of the rail 73 with the slot 75 secures the cover 7 onto the closure flap assembly 5. The interior of the cylindrical mounting portion 69 also includes a pair of spaced apart magnet retainers 77 for retaining permanent magnets 79. These magnets 79 help to guide a magnetic sensor (not shown) disposed on the robotic arm of an automatic filling machine to a proper position in the wall of a vehicle. In the preferred embodiment, the magnet retainers 77 are integrally formed with the underside of upper wall 81.

Upper wall 81 includes a centrally disposed circular port 83 which aligns with the circular opening 34 of the closure flap assembly 5 when these two parts are mated. The top surface of the upper wall 81 forms a guide face 85 for guiding the end of a fuel nozzle into the centrally disposed port 83. To this end, guide face 85 has a frustro-conical recess 87 that circumscribes the circular port 83. One side of the frustro-conical recess 87 includes a V-shaped indentation 89 for a purpose which is explained hereinafter.

The operation of the invention will now be described with respect to FIG. 7, and FIGS. 8A–8C. In the first step of the operation of the invention, the combination of the closure ring 3 and closure flap assembly 5 is screwed or otherwise secured onto the upper end of the filler neck 91 of an automotive vehicle. In the event that the filler neck 91 is of the type that includes a restrictive flap 93 secured to the inner diameter of the neck 91 by means of a pivotal connection 95, the ratchet lock mechanism is used to rotate the closure flap assembly 5 with respect to the ring 3 so that the pivotal mounting assembly 53 of the closure flap 47 (which is indicated by the twelve-o'clock position printed on the front side 36 of the member 33) is disposed 180° in opposition to the pivotal connection 95 between the restrictive flap 93 and the filler neck 91. Such an opposing orientation aligns the flaps 47 and 93, thereby allowing a pump nozzle 100 to be inserted far enough into the filler neck 91 to fill the gas tank (not shown). Such an orientation also minimizes the risk that a pump nozzle 100 extended through both the closure flap 47 and restrictive flap 93 will not jam between the edges of the flaps 47,93 when withdrawn.

FIGS. 8A–8C illustrate how the proper inclination and orientation of the guide face 85 on the upper wall 81 of the cover 7 may be used to facilitate the insertion of a pump nozzle 100 into the cap 1. These Figures illustrate different filler necks 91*a,b,c*, each of which is oriented at a different angle A1, A2, and A3 with respect to the horizontal H. In a situation where this angle is relatively small, as it is for neck 91*a* illustrated in FIG. 8A, the upper wall 81 is inclined substantially orthogonally with respect to the cylindrical mounting portion 69 of the cover 7. Hence, it is easy for the nozzle 100 of a gas pump to be aligned and inserted through the circular opening 34 in the closure flap assembly 5. However, when the filler neck is more vertically oriented, such as neck 91*b* illustrated in FIG. 8B, such alignment and insertion becomes more difficult due to the more oblique orientation between the nozzle 100 and the cover port 83. Accordingly, the upper wall 81 of the cap 1 is formed at an angle relative to the surface of the circular member 33 of the closure flap assembly 5 such that the angular orientation between the guide face 85 on the upper wall 81 and the end of the nozzle 100 is still substantially orthogonal. In a case where the filler neck is even more vertically oriented, such as neck 91*c* illustrated in FIG. 8C, the upper wall 81 is formed at an even greater angle with respect to the circular member 33 of the closure flap assembly 5. The provision of such a steeper angle again allows the end of the nozzle 100 to engage the guide face 85 presented by the upper wall 81 at a substantially orthogonal angle. Such an orthogonal engagement angle is particularly important if the vehicle to which the filler neck belongs is being filled by an automatic filling machine having a nozzle 100 that extends and retracts at an angle that is substantially orthogonal with respect to the wall W of the automobile surrounding the gas cap 1.

Now that the importance of the angle of engagement between the nozzle 100 and the cap 1 is understood, the balance of the operation of the invention may now be explained. After the closure flap assembly 5 has been installed over the closure ring 3 in the manner described with respect to FIG. 7, the operator of the invention must then install the cover 7 over the assembly 5. To perform this step, the operator must first ascertain the severity of the angle between the filler neck and the horizonal H. In cases where the filler neck is disposed at only a small angle A1, a cover having a substantially orthogonally oriented upper wall 81 may be chosen with good results. However, in instances where the filler neck is disposed at a greater angle with respect to the horizontal H (as is the case illustrated in FIG. 8B and 8C) a cover 7 whose upper wall 81 has been formed at an angle will be chosen, the size of the angle being dependent upon the angle A2,A3 between the filler neck 91*b*,91*c* and the horizontal H. To properly orient such an angled cover over the closure flap assembly 5, the operator of the cap 1 aligns the V-shaped indentation 89 so that it is upwardly positioned with respect to the balance of the cover 7. The cap 7 is then slid into engagement over the periphery of the circular member 33 of assembly 5, and thereby completing the assembly process of the cap 1 on a filler neck 91.

With reference now to FIG. 9, the filler cap 1 also includes an overpressure valve assembly 101 installed over the bearing block 57. The purpose of the valve assembly 101 is to relieve pressure in the gas tank when this pressure exceeds 11 kpa in order to prevent the gas tank of the vehicle (not shown) from rupturing. To this end, the valve assembly is formed from a pair of gas-conducting apertures 102*a,b* present in the top wall 103 of the bearing block 57. A pair of valve elements in the form of rubber valve discs 105*a,b* are disposed over the apertures 102*a,b*. Each of these discs 105*a,b* is normally positioned within an annular valve seat 107*a,b* that circumscribes each of the gas-conducting apertures 102*a,b*. A yoke member 109, which may be formed from stamped steel, is disposed over the valve discs 105*a,b*, as shown. The yoke member 109 includes a top plate 111 flanked by a pair of leg members 113*a,b*. Each of the leg members 113*a,b* terminates in a foot portion 115*a,b*. Each of these foot portions 115*a,b* includes a circular bore 117*a,b* through which a mounting screw 119*a,b* extends through. Coil springs 121*a,b* compressed between the screw heads 123 and the feet 115*a,b* bias the top plate 111 of the yoke member 109 against the valve discs 105*a,b* such that the discs 105*a,b* are sealingly engaged around the annular valve seats 107a,b. However, when an overpressure condition occurs within the gas tank of the vehicle, the rubber valve discs 105a,b overcome the biasing force applied to their upper surfaces via the coil springs 121a,b, and lift off their respective valve seats 107a,b. This in turn allows compressed vapors to escape out between the top wall 103 of the bearing block 57, and the top plate 111 of the yoke member 109. The compressive strength of the springs 121a,b is selected so that such disengagement between the valve discs 105a,b occurs when the tank pressure equals or exceeds 11 kpa. Additionally, the diameter of the apertures 102a,b is selected so that the overpressure valve assembly 109 can allow overpressure vapors to escape at a rate of approximately 160 liters of volume per minute at an aperture pressure of about 20 kpa, thus insuring a relatively fast de-pressurization of the vehicle gas tank.

Although the invention has been described with respect to a single preferred embodiment, various additions, modifications, and variations will become evident to persons of ordinary skill in the art. All such additions, modification, and variations are included within the scope of this patent, which is limited only by the claims appended hereto.

What is claimed:

1. A self-closing cap for a filler neck of a container wherein said neck includes a restrictive flap pivotally connected thereto, comprising:
    a closure ring having an annular body and means for detachably mounting the periphery of said annular body around a peripheral edge of said filler neck, and
    a closure flap assembly including a circular member having an opening for receiving a nozzle, a closure flap, means for pivotally mounting said closure flap over said opening, and means for affixing said circular member to said annular body such that said pivotal mounting means is substantially opposite to a pivotal connection between said restrictive flap and said neck, and
    an overpressure valve assembly mounted onto said closure ring for releasing gases and vapors from said container when the pressure in the container reaches a predetermined limit.

2. The self-closing cap as defined in claim 1, wherein said container is the fuel tank of an automotive vehicle.

3. The self-closing cap as defined in claim 2, further including a cover means detachably mountable over said closure flap assembly.

4. The self-closing cap as defined in claim 3, wherein said cover means includes a port for receiving a nozzle and a guide face for guiding said nozzle into said port.

5. The self-closing cap as defined in claim 4, wherein said guide face is inclined with respect to said circular member of said closure flap assembly to facilitate the guiding of said nozzle into said port.

6. The self-closing cap as defined in claim 5, wherein said filler neck is inclined at an oblique angle with respect to an adjacent wall of said vehicle, and said inclination of said guide face orients said face at an angle that facilitates the insertion of a fuel nozzle from an automatic filling machine.

7. The self-closing cap as defined in claim 4, wherein said cover means includes means for guiding the nozzle of an automatic fuel dispensing machine.

8. The self-closing cap as defined in claim 7, wherein said guide means is a permanent magnet.

9. The self-closing cap as defined in claim 1, wherein said closure flap is spring biased over said opening in said circular member.

10. The self-closing cap as defined in claim 1, wherein said means for affixing said circular member to said annular body includes a ratchet lock mechanism.

11. An improved self-closing cap for a filler neck of a fuel tank of an automotive vehicle including a closure ring having an annular body and means for detachably mounting the periphery of said annular body around a peripheral edge of said filler neck, and a closure flap assembly including a circular member having an opening for receiving a nozzle, a closure flap, and means for pivotally mounting said closure flap over said opening, wherein the improvement comprises:
    means for affixing said circular member of said closure flap assembly to said annular body such that the angular orientation of said pivotal mounting means is adjustable relative to said annular body; and
    an overpressure valve assembly mounted onto said circular member for releasing gases and vapors from said container when the pressure in the container reaches a predetermined limit.

12. The improved self-closing cap for a filler neck of a fuel tank of an automotive vehicle defined in claim 11, wherein said overpressure valve assembly includes at least one gas-conducting aperture, a valve element disposed over a valve seat circumscribing said aperture, and a means for biasing said valve element against said valve seat in sealing engagement.

13. The improved self-closing cap for a filler neck of a fuel tank of an automotive vehicle as defined in claim 12, wherein an amount of biasing force that said biasing means applies to a top side of said valve element is balanced against an amount of pneumatic pressure applied to a bottom side of said valve element by gases and vapors from said container such that said pneumatic pressure overcomes said biasing force when the pressure in the container reaches said predetermined limit.

14. The improved self-closing cap for a filler neck of a fuel tank of an automotive vehicle as defined in claim 13, wherein said biasing means includes a spring loaded yoke member having a top plate that overlies said valve element.

15. The improved self-closing cap for a filler neck of a fuel tank of an automotive vehicle as defined in claim 14, wherein said circular member includes a bearing block that forms part of said means for pivotally mounting said closure flap over said opening, and said gas conducting aperture is present in a top wall of said bearing block.

16. The improved self-closing cap for a filler neck of a fuel tank of an automotive vehicle as defined in claim 12, wherein said predetermined limit of said container pressure is between about 10 and 12 kpa.

17. The improved self-closing cap for a filler neck of a fuel tank of an automotive vehicle as defined in claim 11, wherein said means for affixing said circular member to said annular body includes a ratchet lock mechanism.

18. A self-closing cap adapted for use on a filler neck of a fuel tank of a vehicle, comprising:
    a closure ring having an annular body and means for detachably mounting the periphery of said annular body around a peripheral edge of a filler neck;
    a closure flap assembly including a circular member having an opening for receiving a nozzle, a closure flap, means for pivotally mounting said closure flap over said opening, and a mounting for rotatably connecting said circular member to said annular body such that the angular position of said pivotal mounting means is adjustable relative to said annular body of said closure ring; and
    a cover disposed over said closure flap assembly.

19. The self-closing cap defined in claim 18, wherein said mounting for rotatably connecting said circular member to said annular body includes a ratchet lock mechanism.

20. The self-closing cap defined in claim 19, wherein said ratchet lock mechanism allows said circular member to be angularly adjustable relative to said closure ring only in a clockwise direction.

21. The self-closing cap defined in claim 18, wherein said cover includes means for snap-fitting said cover over said closure flap assembly.

22. The self-closing cap defined in claim 18, wherein said means for detachably mounting the periphery of said annular body around a peripheral edge of said filler neck includes bayonet lugs.

23. The self-closing cap defined in claim 18, wherein said means for detachably mounting the periphery of said annular body around a peripheral edge of said filler neck includes screw threads.

24. The self-closing cap defined in claim 18, wherein said cover includes a port for receiving a nozzle and a guide face for guiding said nozzle into said port.

25. A self-closing cap adapted for use on a filler neck of a fuel tank of a vehicle, comprising:
   a closure ring having an annular body and means for detachably mounting the periphery of said annular body around a peripheral edge of a filler neck;
   a closure flap assembly including a circular member having an opening for receiving a nozzle, a closure flap, means for pivotally mounting said closure flap over said opening, and a mounting including a ratchet mechanism for rotatably connecting said circular member to said annular body such that the angular position of said pivotal mounting means is adjustable relative to said annular body of said closure ring; and
   a cover detachably mountable over said closure flap assembly and including a port for receiving a nozzle and a guide face for guiding said nozzle into said port.

26. A self-closing cap adapted for use on a filler neck of a fuel tank of a vehicle, comprising:
   a closure ring having an annular body and means for detachably mounting the periphery of said annular body around a peripheral edge of a filler neck;
   a closure flap assembly including a circular member having an opening for receiving a nozzle, a closure flap, means for pivotally mounting said closure flap over said opening, and a rotatable mounting including a ratchet lock mechanism for rotatably and sealingly connecting said circular member to said annular body such that the angular position of said pivotal mounting means is adjustable relative to said annular body of said closure ring; and
   a cover disposed over said closure flap assembly.

27. The self-closing cap defined in claim 26, wherein said rotatable mounting includes an O-ring disposed between said circular member and annular body for providing a vapor tight seal therebetween.

28. A self-closing cap adapted for use on a filler neck of a fuel tank of a vehicle, comprising:
   a closure ring having an annular body and means for detachably mounting the periphery of said annular body around a peripheral edge of a filler neck;
   a closure flap assembly including a circular member having an opening for receiving a nozzle, a closure flap, means for pivotally mounting said closure flap over said opening, and a mounting including a ratchet mechanism and O-ring for rotatably and sealingly connecting said circular member to said annular body such that the angular position of said pivotal mounting means is adjustable relative to said annular body of said closure ring; and
   a cover detachably mountable over said closure flap assembly and including a port for receiving a nozzle.

29. The self-closing cap as defined in claim 28, wherein said cap is adapted for use on a filler neck having a restrictive flap pivotally connected on one side within said filler neck, and said restrictive flap and said closure flap are spring biased over said neck inner diameter and opening, respectively, and wherein mounting allows the pivotal connection and said pivotal mounting means to be positioned opposite to one another to facilitate the insertion and withdrawal of a fuel dispensing nozzle from an automatic filling machine through said cap and filler neck.

30. A method for mounting a self-closing cap onto a filler neck of a vehicle wherein said cap includes a closure ring having an annular body, and a closure flap assembly including a circular member having an opening for receiving a nozzle, a closure flap, means for pivotally mounting said closure flap over said opening, and a mounting including a ratchet lock mechanism for rotatably connecting said circular member to said annular body, comprising the steps of:
   securing said annular body of said closure ring around an end of said filler neck; and
   rotating said circular member of said closure flap assembly via said ratchet lock mechanism to a desired angular orientation with respect to said closure ring via said mounting means.

31. The method defined in claim 30, wherein said neck includes a restrictive flap, and a pivotal connection for pivoting said flap over an inner diameter of the neck, and wherein said circular member of said closure flap assembly is angularly positioned such that said pivotal mounting means is disposed about 180° from said pivotal connection in said filler neck.

32. The method as defined in claim 30, wherein said cap includes a cover mountable over said closure flap assembly including a port for receiving a nozzle, and a guide face for guiding said nozzle into said port, said guide face being inclined at an angle relative to said circular member of said closure flap assembly when said cover means is mounted over said closure flap assembly, further including the step of mounting said cover means onto said closure flap assembly so that said guide face is inclined at an angle that facilitates the receipt of a fuel dispensing nozzle from an automotive fuel dispensing machine.

* * * * *

UNITED STATES PATENT AND TRADEMARK OFFICE
CERTIFICATE OF CORRECTION

PATENT NO.   : 6,035,906
DATED        : March 14, 2000
INVENTOR(S)  : Siegfried Ott It is certified that error appears in the above-indentified patent and that said Letters Patent is hereby corrected as shown below:

Title page, item [54] and col. 1, should read as follows:
-- SELF-CLOSING GAS CAP FOR AUTOMATIC FILLING MACHINES--.

Signed and Sealed this

Thirteenth Day of March, 2001

*Attest:*

NICHOLAS P. GODICI

*Attesting Officer*   *Acting Director of the United States Patent and Trademark Office*